United States Patent [19]
Hoffart

[11] Patent Number: 5,951,124
[45] Date of Patent: Sep. 14, 1999

[54] SELF-CLEANING TRACK

[76] Inventor: Ronald J. Hoffart, 755 2nd Ave. NW, West Fargo, N. Dak. 58078

[21] Appl. No.: 08/988,268

[22] Filed: Dec. 10, 1997

[51] Int. Cl.⁶ ................................................. B62D 55/18
[52] U.S. Cl. .......................... 305/111; 305/113; 305/198
[58] Field of Search .................................... 305/111, 113, 305/114, 198, 201

[56] References Cited

U.S. PATENT DOCUMENTS

| | | | |
|---|---|---|---|
| 1,100,148 | 6/1914 | Perry | 305/113 |
| 1,901,421 | 3/1933 | Streich | 305/111 |
| 1,924,161 | 8/1933 | Knox | 305/111 X |
| 2,330,246 | 9/1943 | Schonitzer | 305/198 |
| 2,455,307 | 11/1948 | Irvin | 305/201 X |
| 2,973,995 | 3/1961 | Weier | 305/113 |
| 3,497,271 | 2/1970 | Keller | 305/114 |

*Primary Examiner*—Russell D. Stormer
*Attorney, Agent, or Firm*—Michael S. Neustel

[57] ABSTRACT

A self-cleaning track for reducing the accumulation of debris between the moving and non-moving components of an endless track. The inventive device includes a plurality of track pads interconnected to form an endless track. Each track pad comprises at least one grouser member extending between a pair of opposing side members, a cavity within each of the side members, an opening projecting into a side of each side member exposing the cavity, a pair of slots on opposing sides of the side members for pivotally receiving a link member, and a ramp portion projecting into each side member from the a lower portion of the slots. The opening allows debris accumulated within the cavity to escape freely. The ramp portions of the slots allow the debris to descend from the cavity when the track pad is in a substantially upper position along the endless track.

20 Claims, 8 Drawing Sheets

SELF-CLEANING TRACK

BACKGROUND OF THE INVENTION

1. Field of the Invention

The present invention relates generally to endless tracks and more specifically it relates to a self-cleaning track which does not accumulate and compress debris between the moving components of the track.

Endless tracks have been utilized for years for various vehicles. A common problem for most endless tracks is the accumulation of debris such as dirt and rock which become crushed and compressed between the moving components, especially the linkages. The compressed debris compounds over time into a hardened structure which eventually must be removed by the operator of the vehicle to prevent wearing and future breakage. Removal of the compressed debris is time consuming and is difficult to accomplish within the narrow confines of the tracks. Hence, there is a need for a self-cleaning endless track which reduces the amount of cleaning required by the operator.

2. Description of the Prior Art

There are numerous endless track devices. For example, U.S. Pat. Nos. 4,099,794 to Hoffart; 3,497,271 to Keller; 2,680,421 to Baker; 1,931,522 to Barnes et al.; and 1,915,561 to Van Derveer are all illustrative of such prior art.

While these devices may be suitable for the particular purpose to which they address, they are not as suitable for preventing accumulation of debris between the moving components of the track. The prior art does not disclose an endless track which is self-cleaning for preventing the accumulation and compression of debris such as dirt and rocks.

In these respects, the self-cleaning track according to the present invention substantially departs from the conventional concepts and designs of the prior art, and in so doing provides an apparatus primarily developed which reduces the accumulation and compression of debris between the moving components of the track.

SUMMARY OF THE INVENTION

A primary object of the present invention is to provide a self-cleaning track that will overcome the shortcomings of the prior art devices.

Another object is to provide a self-cleaning track that is self-cleaning.

An additional object is to provide a self-cleaning track that reduces the amount of accumulated debris between the moving and nonmoving components.

A further object is to provide a self-cleaning track that extends the useful life of the endless track.

Another object is to provide a self-cleaning track that reduces the amount of down time an operator of a vehicle incurs cleaning accumulations from the endless track.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
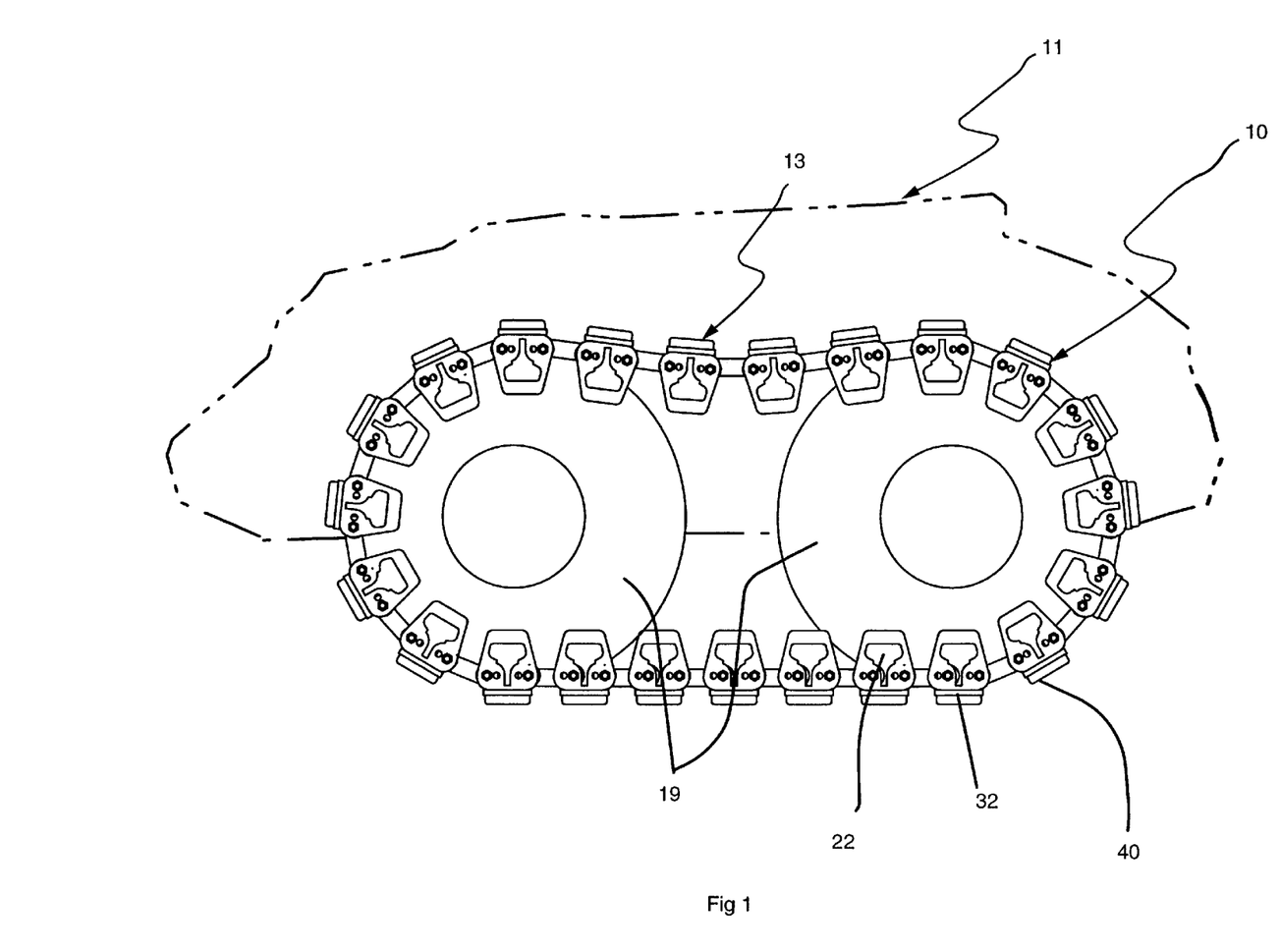
FIG. 1 is a side view of the present invention surrounding the wheels of a skid-loader.
Figure 2:
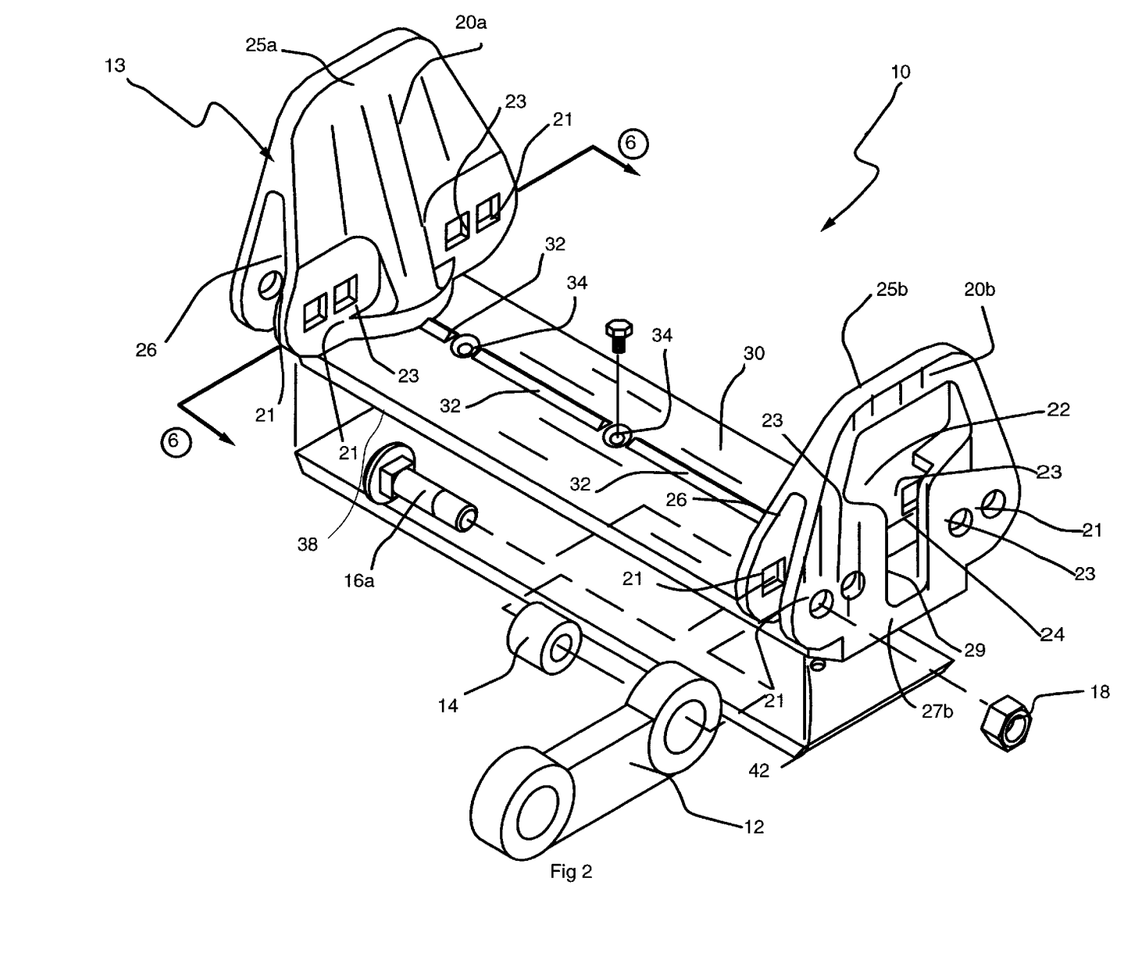
FIG. 2 is an exploded upper perspective view of the present invention.
Figure 3:
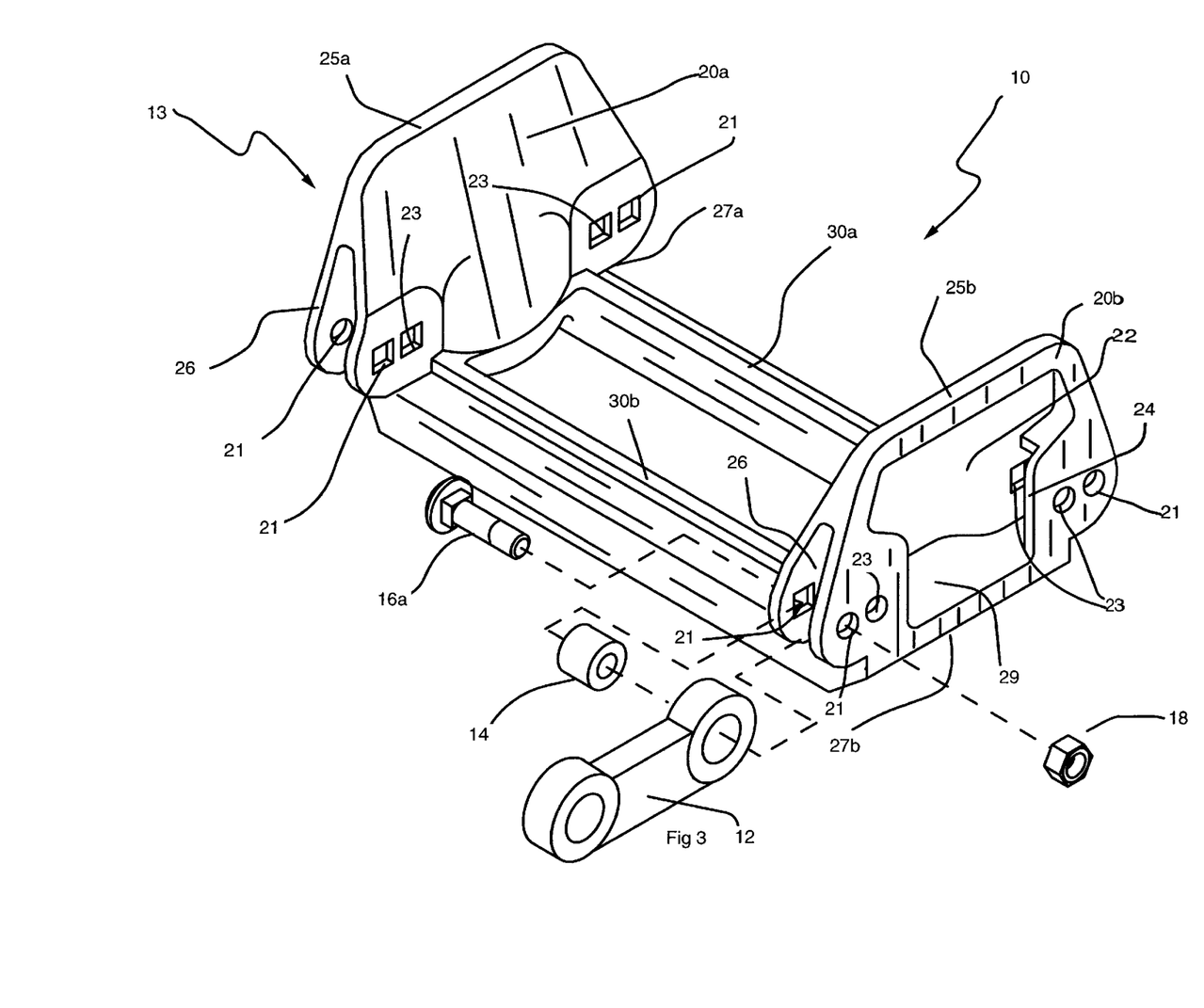
FIG. 3 is an exploded upper perspective view of a second embodiment of the present invention.

Turning now descriptively to the drawings, in which similar reference characters denote similar elements throughout the several view, FIGS. 1 through 7 illustrate a self-cleaning track 10, which comprises a plurality of track pads 13 interconnected to form an endless track as best shown in FIG. 1 of the drawings. Each track pad 13 comprises at least one grouser member 30 extending between a second end 27a–b of a pair of opposing side members 20a–b, a cavity 22 within each of the side members 20a–b, an opening 24 projecting into a side of each side member 20a–b exposing the cavity 22, a pair of slots 26 on opposing sides of the side members 20a–b for pivotally receiving a link member 12, and a ramp portion 28a–b projecting into each side member 20a–b from the a lower portion of the slots 26. The opening 24 allows debris accumulated within the cavity 22 to escape freely. The ramp portions 28a–b of the slots 26 allow the debris to descend from the cavity 22 when the track pad 13 is in a substantially upper position along the endless track. The side members 20a–b have a first end 25a–b opposite of the second end 27a–b as shown in FIGS. 2 and 3 of the drawings.

Figure 4:
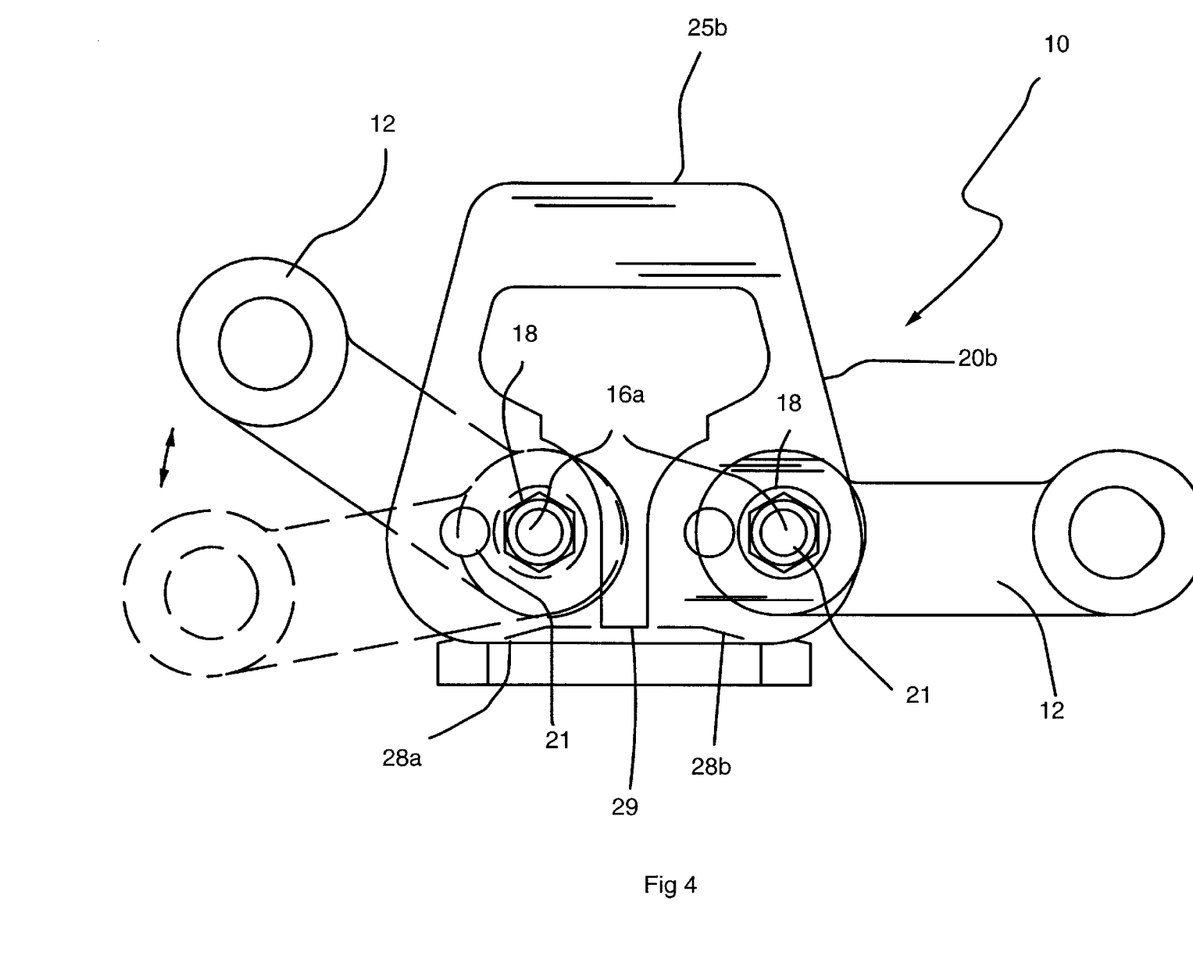
FIG. 4 is a side view of the present invention disclosing the cleaning opening.
Figure 5:
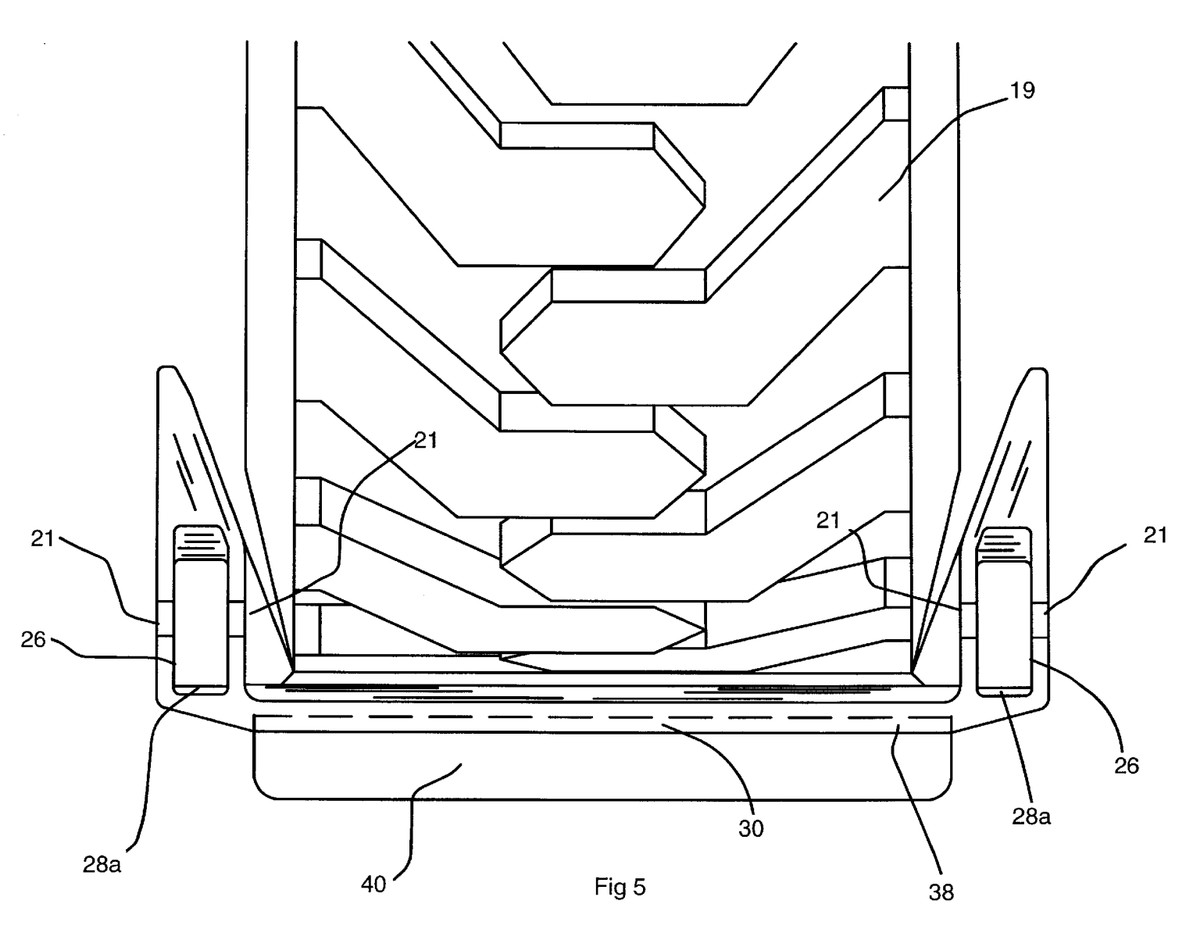
FIG. 5 is a front view of the present invention disclosing the ramp portions.
Figure 6:
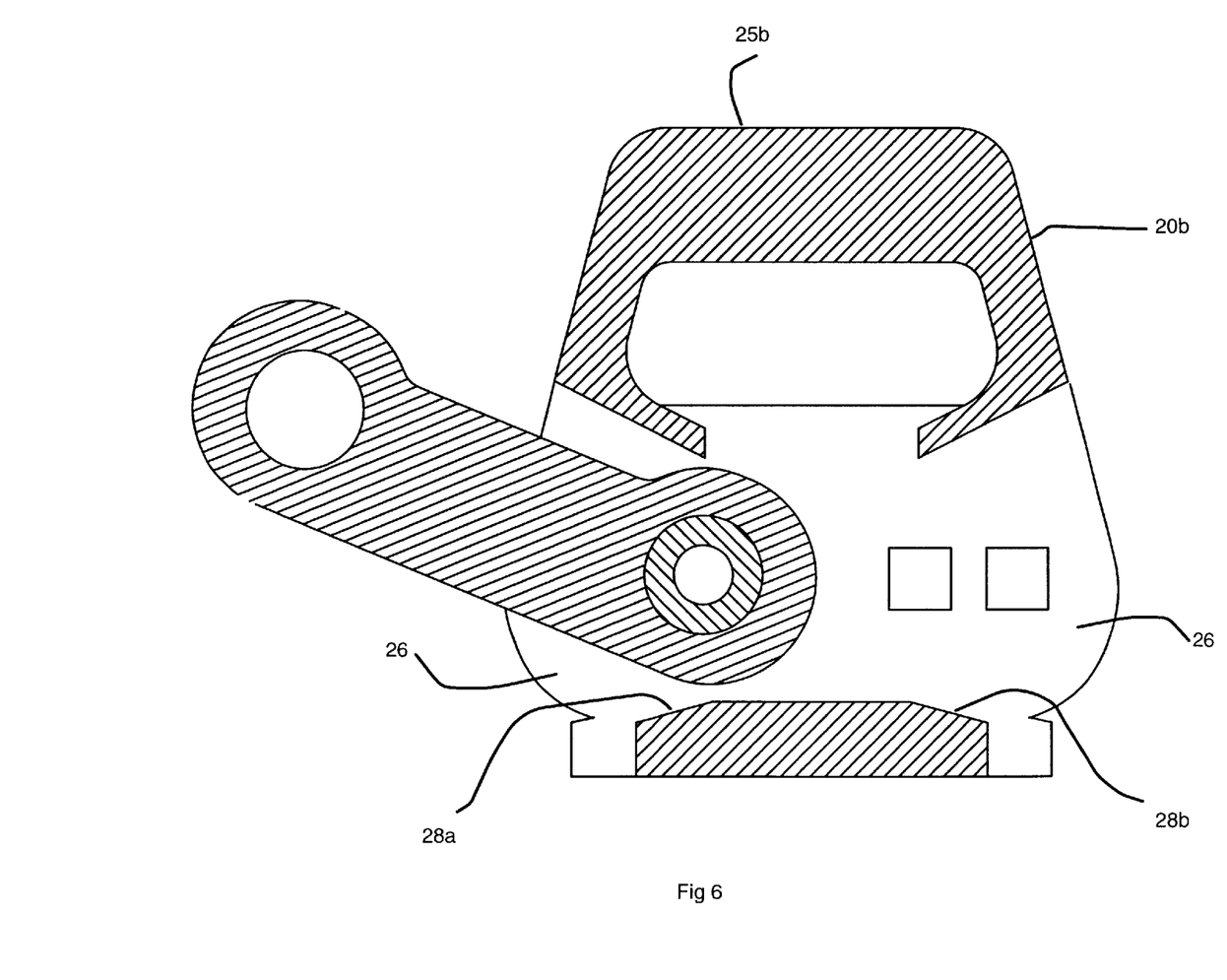
FIG. 6 is a cross sectional view along line 6—6 from FIG. 2.

As shown in FIG. 2 of the drawings, the side members 20a–b are in opposition to one another. Each of the side members 20a–b has a cavity 22 throughout exposed at opposing ends by the pair of slots 26 as best shown in FIG. 5 of the drawings. Each slot 26 receives a link member 12 pivotally connected within by a fastener 16a, bushing 14 and nut 18 combination as shown in FIGS. 2 and 3 of the drawings. A pair of outer apertures 21 and inner apertures 23 project through each of the side members as shown in FIGS. 2 through 4 of the drawings. The user may adjust the length of the track by positioning the link member 12 in the desired aperture 21, 23. When the pair of inner apertures 23 are selected, the track pads 13 of the self-cleaning track 10 are especially prone to wear and tear from the accumulation of debris within the cavity 22 portion because the link member 12 prevents the debris from escaping from the cavity 22 and also compresses the debris so that it is hardened into the side member 20a–b. The hardened debris then rubs against the link member 12 and also allows larger debris such as rocks to become jammed in between the link member 12 and the side member 20a–b potentially damaging the track pad 13 and link member 12.

As shown in FIGS. 2 through 4, the opening 24 projects into an outside surface of the side members 20a–b so as to expose the cavity 22. Debris which would usually enter through the slots 26 and be deposited within the cavity 22 are now dispersed through the opening 24 while the self-cleaning track 10 is in operation. As best shown in FIG. 5, the ramp portions 28a–b allow the debris brought in through the slots 26 and the opening 24 that are not dispersed through the opening 24 to be removed from the cavity 22 when the track pad 13 is positioned in a substantially upper position. The vibration of the self-cleaning track 10 when in operation shifts the debris towards one of the ramp portions 28a–b wherein the debris is easily discharged from the side members 20a–b.

Figure 7:
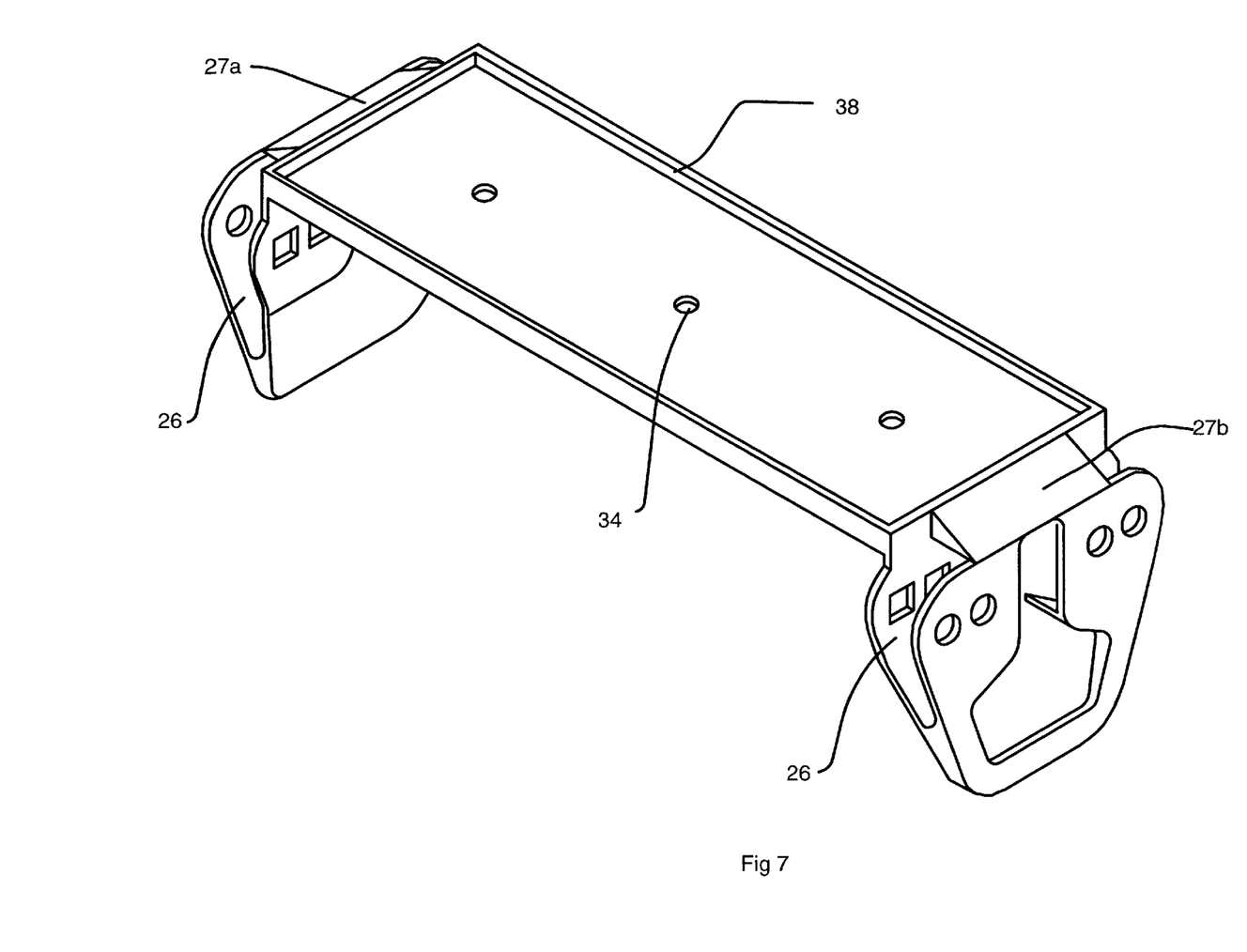
FIG. 7 is an lower perspective view of the present invention.
Figure 8:
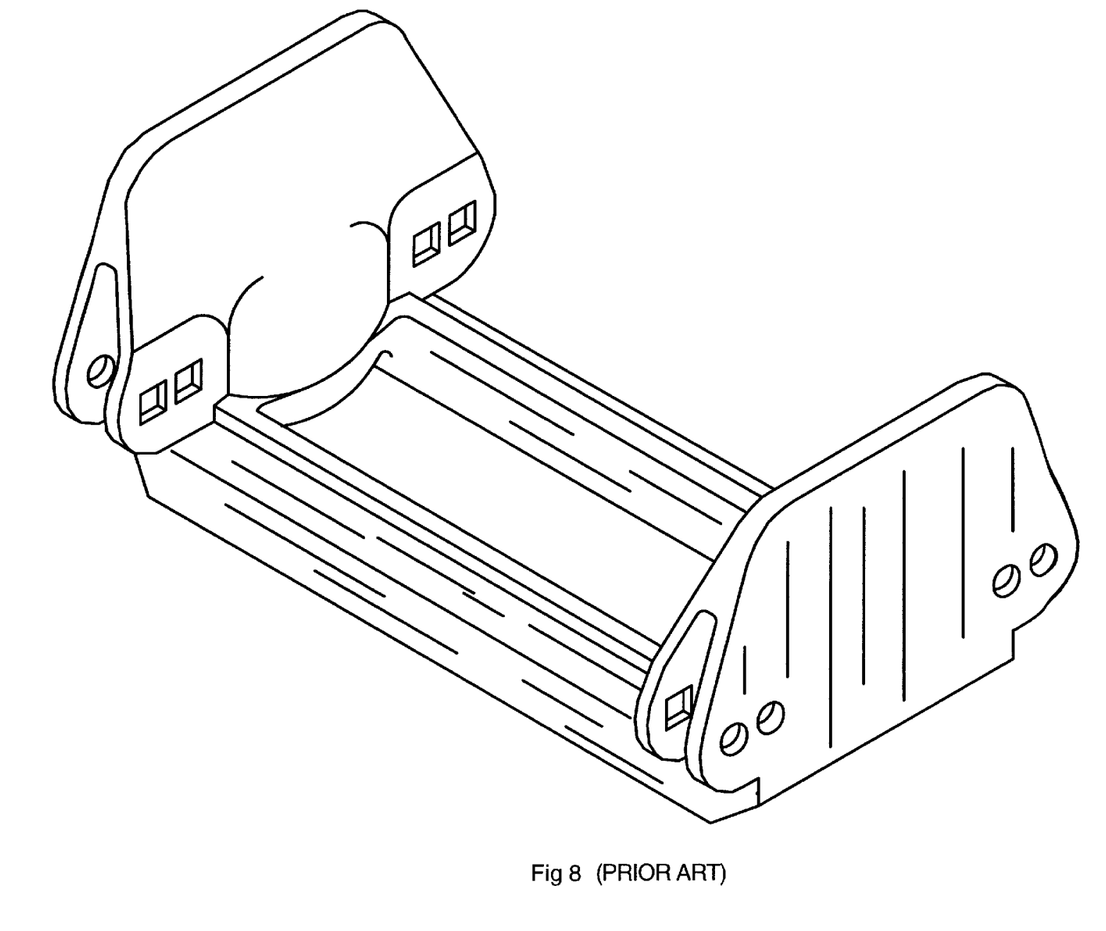
FIG. 8 is an upper perspective view of a prior art invention.

As shown in FIGS. 2 and 3 of the drawings, at least one grouser member 30 is attached to a second end 27a–b of the opposing side members 20a–b. As shown in FIG. 2 of the drawings, a top surface of the grouser member 30 preferably includes a ridge 32 parallel to a longitudinal axis of the grouser member 30. The ridge 32 provides increased gripping for the tires 19 of the skid-loader 11. The ridge 32 preferably includes a plurality of depressions which expose a corresponding plurality of apertures 34. A plurality of fasteners 16b project through the apertures 34 where a threaded portion of the fasteners 16b are in threaded engagement with a plurality of threaded apertures 42 within a wear plate 40. The engaging ends of the fasteners 16b are protected within the ridge 32 thereby reducing the amount of wear upon the fasteners 16b from the tires 19 and thereby reducing wear upon the tires 19 from sharp edges of the engaging ends. The wear plate 40 is removably juxtaposed to a bottom surface of the grouser member 30. The grouser member 30 includes a lip 36 forming a substantially rectangular shape which receives the wear plate 40 as shown in FIG. 7 of the drawings. The lip 36 prevents debris, such as dirt and rocks, from wedging between the wear plate 40 and the grouser member 30 which can cause the fasteners 16b to shear off over time. The wear plates 40 extend the useful life of the self-cleaning track 10 by reducing the amount of wear that the grouser member 30 incurs. The wear plates 40 are easily replaced when worn to an undesirable level.

In use, the self-cleaning track 10 is adjustably fitted about a pair of tires 19 of the skid-loader 11 as shown in FIG. 1 of the drawings. The user operates the skid-loader 11 as usual causing the self-cleaning track 10 to rotate endlessly about the tires 19. The wear plates 40 engage the ground surface during travel, thereby substantially reducing the amount of wear on the grouser members 30. The lip 36 surrounding the wear plate 40 prevents debris from being wedged between the wear plate 40 and the grouser member 30, thereby preventing shearing of the fasteners 16b. When debris is brought into the cavity 22 during operation of the self-cleaning track 10, the debris is constantly dispersed through the opening 24 and through the ramp portions 28a–b, thereby preventing the accumulation of the debris where it would usually be compressed and hardened.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A track pad, comprising:
    a pair of side members each having a front end, a rear end, an upper end, a lower end, an inner surface and an outer surface;
    said pair of side members each including a cavity having a floor;
    an opening projecting into said outer surface exposing said cavity for allowing debris to disperse from said cavity;
    a pair of link members pivotally attachable to said rear end of said pair of side members, wherein said pair of link members are pivotally attachable to a front end of an adjacent track pad;
    at least one grouser member attached between said lower ends of said pair of side members, said grouser member having an upper surface and a lower surface; and
    wherein a pair of slots project into each of said front ends and said rear ends of said pair of side members for pivotally receiving said pair of link members.

2. The track pad of claim 1, wherein said floor includes a slanted portion projecting into said front end and said rear end for allowing said debris to disperse from within said cavity.

3. The track pad of claim 2, wherein each of said side members includes a pair of inner apertures and a pair of outer apertures adjacent said front end and said rear end for pivotally receiving said link member thereby allowing adjustment of a distance between said track pad and said adjacent track pad.

4. The track pad of claim 3, wherein said opening is substantially T-shaped having a traverse portion and a longitudinal portion, said longitudinal portion is substantially parallel to said front end and said rear end.

5. The track pad of claim 4, wherein said floor is inclined in an inverted V-shape for dispersing said debris towards said pair of slots.

6. The track pad of claim 5, wherein said upper surface of said grouser member includes a ridge substantially aligned with a longitudinal axis of said grouser member.

7. The track pad of claim 6, including a replaceable wear plate attached to said lower surface of said grouser member by at least one fastener.

8. The track pad of claim 7, wherein said ridge includes at least one depression wherein said at least one fastener projects through, whereby said ridge reduces contact between said at least one fastener and a tire engaging said grouser member.

9. The track pad of claim 8, wherein said lower surface includes a ridge having a perimeter shaped similar to said replaceable wear plate for receiving said replaceable wear plate and preventing debris from entering between said replaceable wear plate and said lower surface.

10. The track pad of claim 9, wherein said replaceable wear plate is substantially rectangular shaped.

11. A track pad, comprising:
    a pair of side members each having a front end, a rear end, an upper end, a lower end, an inner surface and an outer surface;

said pair of side members each including a cavity;

an opening projecting into said outer surface exposing said cavity for allowing debris to disperse from within said cavity;

a pair of slots projecting into each of said front ends and said rear ends of said pair of side members for pivotally receiving said pair of link members; and at least one grouser member attached between said pair of side members.

12. The track pad of claim 11, wherein said floor includes a slanted portion projecting into said front end and said rear end for allowing said debris to disperse from within said cavity.

13. The track pad of claim 12, wherein each of said side members includes a pair of inner apertures and a pair of outer apertures adjacent said front end and said rear end for pivotally receiving said link member thereby allowing adjustment of a distance between said track pad and said adjacent track pad.

14. The track pad of claim 13, wherein said opening is substantially T-shaped having a traverse portion and a longitudinal portion, said longitudinal portion is substantially parallel to said front end and said rear end.

15. The track pad of claim 14, wherein said floor is inclined in an inverted V-shape for dispersing said debris towards said pair of slots.

16. The track pad of claim 15, wherein said upper surface of said grouser member includes a ridge substantially aligned with a longitudinal axis of said grouser member.

17. The track pad of claim 16, including a replaceable wear plate attached to said lower surface of said grouser member by at least one fastener.

18. The track pad of claim 17, wherein said ridge includes at least one depression wherein said at least one fastener projects through, whereby said ridge reduces contact between said at least one fastener and a tire engaging said grouser member.

19. The track pad of claim 18, wherein said lower surface includes a ridge having a perimeter shaped similar to said replaceable wear plate for receiving said replaceable wear plate and preventing debris from entering between said replaceable wear plate and said lower surface.

20. The track pad of claim 19, wherein said replaceable wear plate is substantially rectangular shaped.

* * * * *

UNITED STATES PATENT AND TRADEMARK OFFICE
CERTIFICATE OF CORRECTION

PATENT NO. : 5,951,124
DATED : September 14, 1999
INVENTOR(S) : Ronald Hoffart

It is certified that error appears in the above-identified patent and that said Letters Patent is hereby corrected as shown below:

<u>Column 5,</u>
Line 7, after the word "receiving" please replace the word "said" with -- a --.
Line 11, please replace "said floor" with -- a floor within said cavity --.

Signed and Sealed this

Twenty-sixth Day of August, 2003

JAMES E. ROGAN
*Director of the United States Patent and Trademark Office*